United States Patent [19]

McAdam

[11] Patent Number: 4,652,834
[45] Date of Patent: Mar. 24, 1987

[54] RAPID ACQUISITION DEMODULATION SYSTEM

[75] Inventor: Peter L. McAdam, Los Angeles, Calif.

[73] Assignee: TRW Inc., Redondo Beach, Calif.

[21] Appl. No.: 522,888

[22] Filed: Aug. 12, 1983

[51] Int. Cl.[4] .............................................. H03D 3/18
[52] U.S. Cl. ..................................... 329/50; 329/122; 329/124; 375/94; 375/111; 375/120; 455/265
[58] Field of Search .................. 328/155; 329/50, 122, 329/124; 375/80, 81, 83, 94, 111, 120; 455/214, 260, 265, 337

[56] References Cited

U.S. PATENT DOCUMENTS

| 3,676,593 | 7/1972 | Muratani et al. | 178/66 A |
| 3,769,587 | 10/1973 | Matsuo et al. | 325/320 |
| 4,100,499 | 7/1978 | Monrolin | 329/50 |
| 4,383,324 | 5/1983 | Dudek et al. | 329/50 X |
| 4,409,562 | 10/1983 | Kurihara | 328/155 X |

Primary Examiner—Eugene R. LaRoche
Assistant Examiner—James C. Lee
Attorney, Agent, or Firm—Robert J. Stern; Noel F. Heal

[57] ABSTRACT

Apparatus for acquiring and demodulating a communication signal employing a feedforward approach to minimize acquisition time. The apparatus includes a phase detection circuit for generating a phase difference signal indicative of the phase difference between an incoming signal and a local reference oscillator, and a phase rotation circuit for adjusting the phase of the local reference by the amount of the phase difference signal, so that the rotated local reference matches the phase of the incoming signal. Basically the same approach is used for carrier acquisition and for data clock acquisition or bit synchronization. A data resolution circuit removes the phase-angle effect of data modulation from the phase error signal, so that an accurate carrier phase error signal is obtained even when the carrier is modulated by data. A special embodiment of the data resolution circuit is provided for the case of non-random data signals.

14 Claims, 5 Drawing Figures

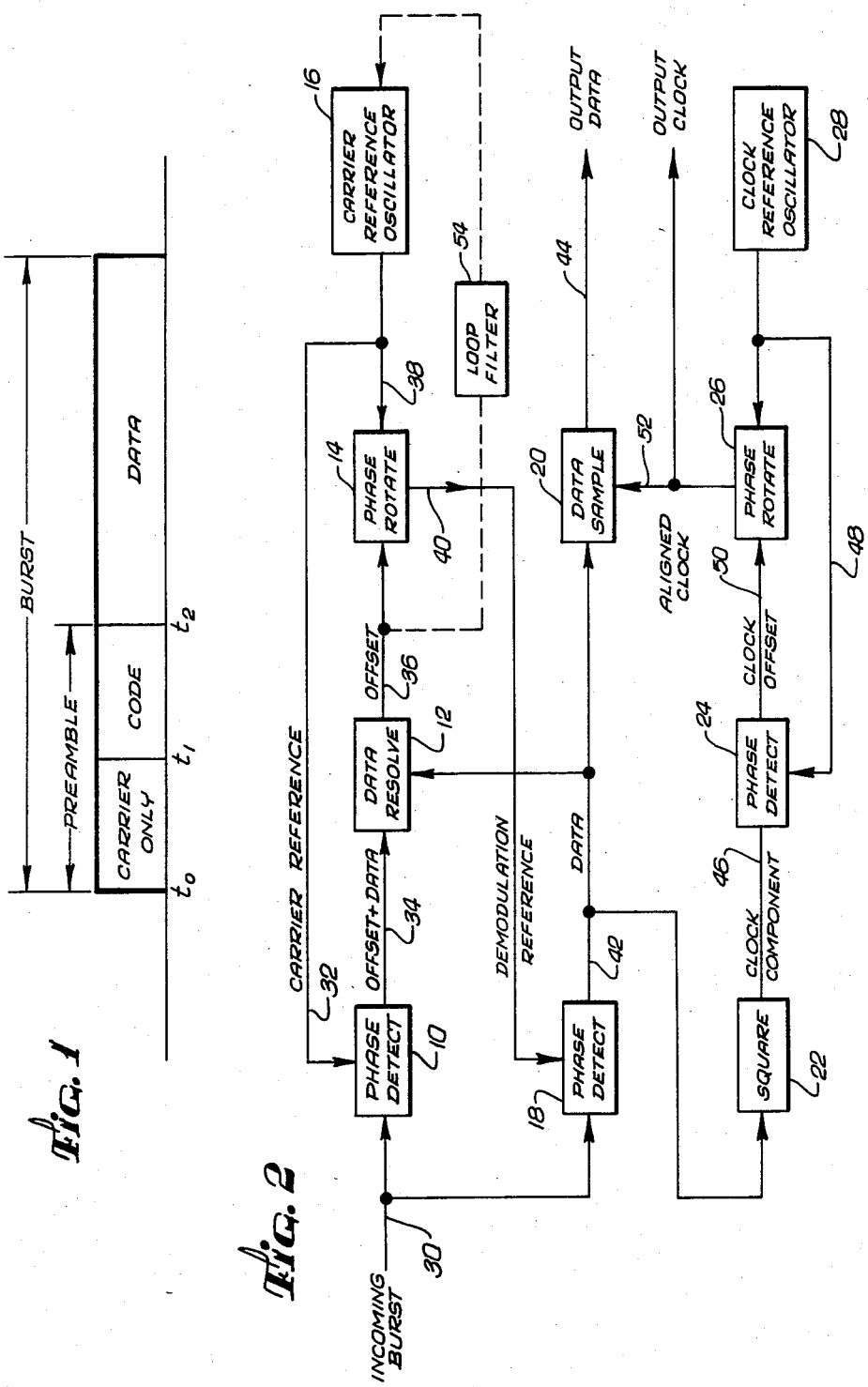

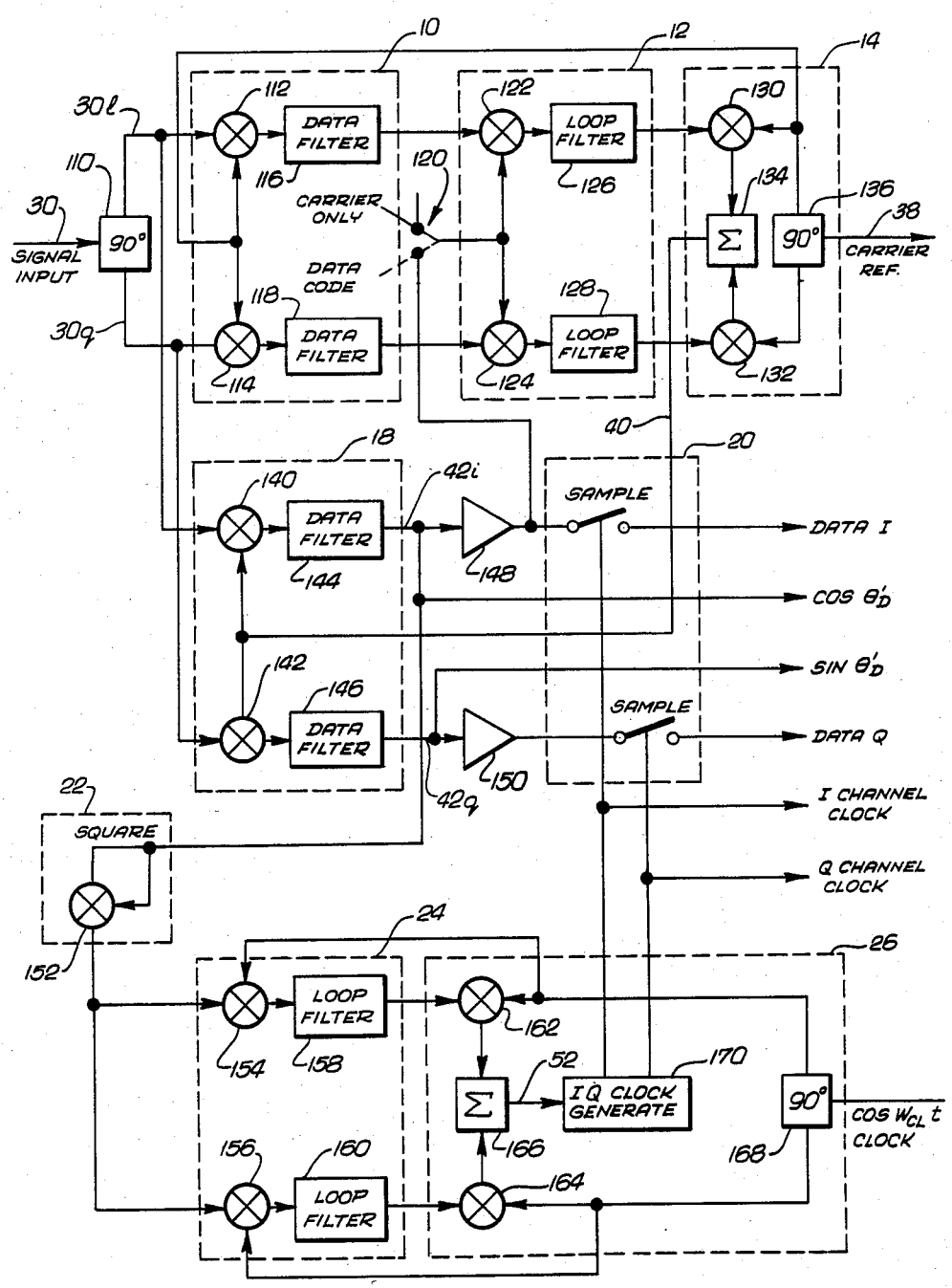

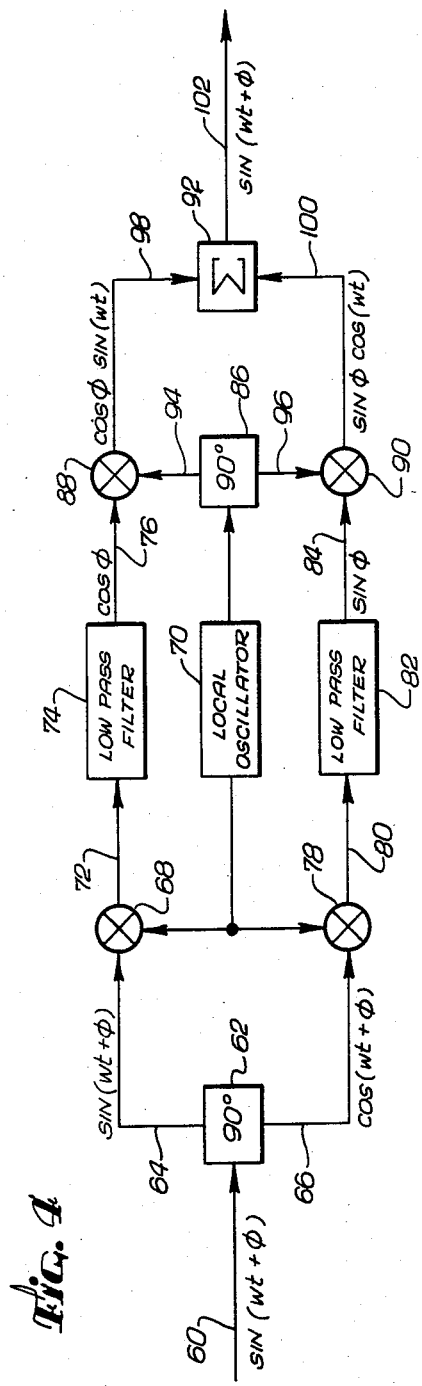

RAPID ACQUISITION DEMODULATION SYSTEM

BACKGROUND OF THE INVENTION

This invention relates generally to demodulation techniques, and more particularly to demodulation in time division multiple access (TDMA) burst communication systems. In TDMA systems a number of independent data transmitting and receiving stations have access to a single data communication link on a time-division basis; that is, the available time for use of the link is allocated among the stations in some uniform manner, or the stations contend with each other for an allocation of time. TDMA burst systems are widely used in orbiting satellite communications. A single satellite may be responsible for receiving and re-transmitting messages from a large number of ground stations. In any event, the performance of a TDMA system depends to a large degree on the efficiency with which the functions of acquisition and demodulation are performed.

In many types of communication systems, information is transmitted over a communication medium, such as a cable, optical fiber or radio link, by means of a high-frequency carrier signal. At a transmitter, the carrier signal is coded or modulated in accordance with one of a number of modulation schemes, to encode the data for transmission. At a receiver, the modulated carrier signal is received and demodulated to recover the transmitted data.

Since the receiver may not have a signal source that is synchronized exactly with the received carrier signal, a first and necessary step prior to demodulation is "acquiring" the carrier signal, by synchronizing the phase or frequency of the received carrier with that of a local oscillator, to produce an exact match in frequency and phase angle. The local oscillator can then be used to effectively subtract out the carrier component and obtain the desired modulation signal.

For digital communications there is a further step in aquisition. Modulation of a carrier signal with digital data may be effected by any of a number of schemes. One of the most common is phase-shift-keying (PSK) modulation, in which digital information is encoded by means of phase shifts of the carrier signal. In quadrature PSK, the phase of the carrier may assume any of four values in the four quadrants, i.e. 45, 135, 225 or 315 degrees with respect to the reference phase angle of the unmodulated carrier. Phase changes representative of digital data are made to occur at the transmitter, but only in synchronism with a data clock signal. Since the data clock is not necessarily available at the receiver, the acquisition process includes the step of synchronizing the incoming data rate with a local clock signal. This step is sometimes referred to as bit synchronization. Once the carrier has been acquired and bit synchronization has been achieved, the data can then be recovered by demodulating the carrier signal.

It will be apparent that the steps of carrier acquisition and bit synchronization constitute unproductive time in the nature of necessary system overhead. In communication systems involving lengthy transmissions of large amounts of data, the overhead is relatively unimportant, but in other systems, such as TDMA burst systems, slow acquisition times translate into extremely low operating efficiencies. Another factor contributing to inefficiency is the degree of degradation that the demodulation system may impose on the theoretical bit error rate of the communication system. Any such degradation represents a reduction in the transmission data rate that is supportable by a given radiated power at the transmitter. Clearly, the ideal demodulation system for TDMA communications is one that has rapid acquisition times and performs close to the theoretical bit error rate limit.

Typically, a burst of information transmitted on a TDMA system includes a preamble preceding the actual data. The preamble comprises a first segment during which only the carrier is transmitted to permit carrier acquisition at the receiver, and a second segment during which a specific pattern of data is transmitted to permit bit synchronization. The carrier acquisition function in prior systems of this type has been implemented by a feedback control loop of some kind. Basically, the difference between the phase of the incoming carrier signal and the phase of a local reference oscillator is detected and used to adjust the phase of one of the signals until the measured difference is reduced to zero. In such feedback loops, the control signal representative of a correction in phase is proportional to the sine of the measured phase difference angle. For an initial phase difference close to 180 degrees, the correction control signal is close to zero, and acquisition is slow, since the small corrective signal takes some time to pull the phase angle away from its initial misalignment.

Another difficulty is that, since the carrier in a quadrature PSK modulation system is modulated by phase shifts of multiples of 90 degrees, the carrier tends to be suppressed or hidden by the modulation. Most prior systems seek to overcome this difficulty by some form of modulation-cross-modulation mixing, using techniques referred to as Costas loops or squaring loops, to recover a carrier signal for use during data modulation times. All of these techniques exhibit some amount of degradation due to the modulation and noise cross-products generated by mixing.

During that portion of the preamble during which a data pattern is received, usually 0, 1, 0, 1 . . . , bit synchronization must be performed. Most systems use a non-linearity, such as square law, to rectify the filtered data stream. The resulting waveform has a strong component at the data transition rate, which is then used to derive the bit synchronization clock signal. Traditionally, the bit synchronization apparatus has included a phase-locked feedback circuit to lock a local clock to the incoming bit rate. Unfortunately, this approach also suffers from long acquisition times if the initial alignment error is near 180 degrees.

It will be appreciated from the foregoing that there has been a need for an improved demodulation system suitable for use in TDMA burst communication systems. As already noted, the ideal demodulation system for this purpose should provide rapid carrier acquisition and rapid bit synchronization, without any degradation in bit transmission rate. The present invention fulfills this need.

SUMMARY OF THE INVENTION

The present invention resides in a demodulation system in which a novel open loop feedforward technique is used to avoid the long acquisition times associated with prior demodulation approaches. Basically, and in general terms, the invention resides in apparatus for synchronizing a locally generated signal with a received signal, the apparatus comprising a local oscillator having substantially the same frequency as the received signal, but not necessarily the same phase, means for generating a phase difference signal indicative of the phase difference between the local oscillator signal and the received signal, and means responsive to the phase difference signal, for rotating the phase of the local oscillator signal by the amount of the phase difference, to provide a rotated local oscillator signal in phase with the received signal. In contrast to feedback control systems, in which an error signal is fed back, usually to adjust the phase of the reference signal until the error reduces to zero, in the apparatus of this invention the error signal is applied to the local oscillator signal, which is fed forward for use in a subsequent stage of acquisition and demodulation.

More specifically, in a first stage of acquisition when only an unmodulated carrier signal is being received, the received signal applied to the means for generating a phase difference signal is the carrier signal, and the local oscillator is generating a signal of substantially the same frequency as the carrier. In a second stage of acquisition, the received signal is modulated with a known data pattern, and additional elements of the apparatus are brought into operation. The apparatus includes a second means for generating a phase difference signal, which compares the incoming signal, modulated with data, with the phase-corrected carrier signal fed forward from the means for rotating the local carrier oscillator signal. The output of this second means for generating a phase difference signal will be a pure data signal, since the phase error of the carrier signal has been removed. This data signal is sampled in data sampling means and provides the desired output data from the apparatus.

When data modulation is present in the carrier signal, the means for generating a carrier phase difference signal would not operate correctly without further compensation, since changes in phase due to data modulation would be interpreted as errors in carrier phase. For this reason, the apparatus also includes means operative automatically when the carrier signal contains data modulation, to remove data modulation effects from the carrier error signal, so that a phase-corrected carrier signal can be generated even when data is being received. This means for removing the carrier modulation effects from the carrier phase error signal includes data resolution means coupled to receive a data signal as one input and an error signal affected both by carrier phase errors and by data modulation as its other input. The output of the data resolution means is an error signal indicative only of errors in carrier phase, the data modulation effects having been removed.

The principles of the invention are also employed in a further stage of acquisition, namely bit synchronization or data clock synchronization. The data sampling means is operated under the control of a clock signal, which must be initially derived from a locally generated reference source. Since this local reference source may not be exactly synchronous with the incoming data rate, means must be provided for aligning the local reference with the incoming data.

For this purpose, the apparatus of the invention may also include means for deriving a data rate from the data signal obtained by demodulation and before sampling. The means for deriving the data rate may, for example, include a squaring circuit, which is known to provide an output with a strong component at the data clock frequency. This derived data rate signal is then compared in yet another means for generating a phase difference signal, with the locally generated clock reference, the output being a clock offset signal. Another means for rotating a locally generated signal, in this case the local clock signal, rotates the local clock signal in accordance with the measured clock offset, and the rotated clock signal so derived is used to control the data sampling means.

It will be understood that the principles of the invention are used in similar fashion to correct for phase errors at various stages of acquisition and demodulation. First, errors in carrier phase are removed and a phase-corrected carrier signal is generated. Then, a data signal obtained by demodulation is incorporated into the carrier phase correction process, to provide continued availability of the phase-corrected carrier reference even when data modulates the carrier. Additionally, a locally generated data clock signal is compared with the received data clock rate and the difference used to rotate the local data clock signal for use in sampling the demodulated data.

The technique of the invention for generating a phase-corrected carrier reference assumes that the local reference is reasonably close in frequency to the received carrier. If the local reference is not close to the carrier in frequency, a different approach may be used, wherein the phase difference signal, in addition to being used to control rotation of the local reference, is also applied to a low-pass loop filter, and thence to a voltage-controlled oscillator from which the local reference is obtained. This arrangement provides control of the frequency as well as the phase of the local carrier reference.

It will be appreciated from the foregoing that the present invention represents a significant improvement over the prior techniques for acquisition and demodulation in communication systems, especially of the TDMA type. In particular, the invention employs a novel feedforward approach to correct for carrier signal offsets and data clock offsets, the carrier signal correction being equally effective for periods when the carrier signal is unmodulated or is modulated by data. The apparatus of the invention has the advantages of acquisition speed and relative simplicity. In addition, the apparatus may be conveniently fabricated as a monolithic or hybrid circuit. Other aspects and advantages of the invention will become apparent from the following more detailed description, taken in conjunction with the accompany drawings.

BRIEF DESCRIPTION OF THE DRAWINGS

FIG. 1 is a diagram illustrating a typical signal burst message format for a time-division-multiple-access (TDMA) communication system;

FIG. 2 is a simplified block diagram of an acquisition and demodulation system in accordance with the present invention;

FIG. 3 is a more detailed block diagram of the system shown in FIG. 2;

FIG. 4 is generalized block diagram of a phase detection and steering circuit used both for carrier phase correction and data clock phase correction in the system of FIGS. 2 and 3; and FIG. 5 is a fragmentary block diagram of a modification to the FIG. 3 system, for use in applications in which the data is not random and does not have a zero mean.

DESCRIPTION OF THE PREFERRED EMBODIMENT

As shown in the accompanying drawings by way of illustration, the present invention is concerned with improvements in the acquisition and demodulation of communication signals, especially as related to time-division-multiple-access (TDMA) communication systems. FIG. 2 shows in simplified form an embodiment of the invention configured for use in a TDMA communication system, in which the type of modulation is quadrature phase-shift keying (QPSK). In this type of modulation, data is encoded onto a high-frequency carrier signal in the form of changes in phase. In particular, data may be represented as a carrier signal shifted in phase by 45, 135, 225 or 315 degrees.

As shown in FIG. 1, a signal burst in such a system typically has three principal parts: a carrier-only portion extending from time $t_0$ to time $t_1$, a code portion extending from time $t_1$ to time $t_2$, during which a particular data pattern is transmitted to allow bit synchronization at a receiver, and a data portion following time $t_2$, for the transmission of real data. The carrier-only portion and the code portion of the format are referred to as the preamble.

The FIG. 2 apparatus includes a carrier phase correction section comprising a phase detection circuit, indicated by reference 10, a data resolving circuit 12, a phase rotation circuit 14 and a carrier reference oscillator 16. In addition there is a demodulation section, comprising another phase detector 18 and a data sampler 20; and a data rate clock correction section, comprising a squaring circuit 22, another phase detection circuit 24, a phase rotation circuit 26 and a clock reference oscillator 28.

An incoming signal on line 30 is input to the first phase detection circuit 10, which has as its other input a reference signal from the carrier reference oscillator 16, over line 32. Each of the phase detection circuits 10, 18 and 24 operates to detect the difference in phase angles of its two inputs. For signals that are modulated in phase, this is equivalent to demodulation. The output of the first phase detection circuit 10 will have one component due to the difference or offset between the incoming carrier phase and the phase of the carrier reference oscillator 16, and another component due to the intended phase shift of the carrier when modulated with data. The output, on line 34, is transferred to the data resolving circuit 12, which, as will be explained with reference to a more detailed block diagram (FIG. 3), has no effect during the carrier-only portion of the preamble. During this period, there is no data modulation on the carrier, and the phase difference signal on line 34 is indicative of only the carrier offset, or difference between the received carrier phase and that of the carrier reference oscillator 16.

The output of the data resolving circuit 12 is transferred to the phase rotation circuit 14, over line 36. This circuit is operative to rotate the phase of the carrier reference received on line 38 by the amount indicated by the input signal on line 36. The resultant phase-corrected carrier reference signal is output on line 40 from the phase rotation circuit 14.

The phase-corrected carrier reference signal on line 40 is fed forward to the second phase detection circuit 18, which demodulates the incoming signal on line 30 and outputs a data signal on line 42. Since the carrier reference signal employed in demodulation is already phase-corrected, the data signal on line 42 contains no offset errors due to carrier phase differences. This data signal on line 42 is sampled in the sampler 20, to provide an output data signal on line 44 from the data sampler. In addition, the data signal on line 42 is fed to the data resolving circuit 12 during the code and data portions of the signal burst. In the data resolving circuit 12, the data modulation component of the phase difference signal input on line 34 is effectively subtracted out, to leave an error signal on line 36 that it is indicative of carrier offset only, even when data is being received.

Although the incoming signal is being properly demodulated in the circuitry as described thus far, the data sampler must be provided with data clock signals at proper times to insure that that the data signal on line 42 is properly sampled. First, a data rate signal has to be derived from the incoming signal. This is accomplished conventionally by means of the squaring circuit 22, which receives as input the data signal on line 42. It is well known that the square of a data signal that changes at a data clock rate will have a strong component at the data clock rate. This clock rate signal, on line 46, is input to the third phase detection circuit 24. A signal from the clock reference oscillator 28 is also input to the phase detection circuit 24, over line 48. The output, on line 50, is a clock offset signal indicative of the difference between the phase of the received data clock rate and the phase of the clock reference oscillator 28. This phase difference on line 50 is input to the second phase rotation circuit 26, which produces a phase-corrected clock signal on line 52, which is connected to the data sampler 20. Thus, the local carrier reference signal is corrected for phase offset errors, the local data clock reference signal is corrected for phase offset errors, and the incoming signal is rapidly acquired and demodulated without the use of feedback loops that tend to have slow acquisition times.

The foregoing description assumes that the local carrier reference oscillator 16 has a frequency that is reasonably close to that of the received carrier signal. If this is not the case, the apparatus may also include a low-pass loop filter 54 connected to receive the offset error signal on line 36. The carrier reference oscillator 16 would then be replaced by a voltage-controlled oscillator, receiving control signals from the loop filter 54 so that its frequency could be appropriately adjusted to match that of the received carrier signal.

FIG. 4 shows in general form the phase detection and steering scheme used in the apparatus of the invention. An input signal on line 60 is connected to a ninety degree rotation circuit 62, where it is split into in-phase and quadrature components on lines 64 and 66, respectively. The in-phase component on line 64 is mixed in an analog multiplier 68 with a signal from a local oscillator 70. The output, on line 72, is low-pass filtered by filter 74 to produce a phase angle error signal on line 76. Similarly, the quadrature component on line 66 is mixed with the inverted local oscillator signal in analog multiplier 78, input over line 80 to another low-pass filter 82 and thence output on line 84.

If the local oscillator output is $\sin \omega t$, and the incoming signal is $\sin(\omega t + \phi)$, then the signals on lines 64 and 66 are $\sin(\omega t + \phi)$ and $\cos(\omega t + \phi)$, respectively. The output of the first multiplier 68 is:

$$[\sin(\omega t+\phi)] \times [\sin(\omega t)] = \tfrac{1}{2}[\cos \phi - \cos(2\omega t + \phi)].$$

and the output of the second multiplier 78 is:

$$[\cos (\omega t+\phi)] \times [-\sin \omega t] = \tfrac{1}{2}[\sin \phi - \sin (2\omega t+\phi)].$$

When these signals are low-pass filtered by the filters 74 and 82, the double-frequency terms disappear and the signals remaining on lines 76 and 84 are proportional cos $\phi$ and sin $\phi$, respectively.

These signals on lines 76 and 84 are then used to rotate the phase of the local oscillator 70, by means of another ninety-degree rotation circuit 86, to produce the in-phase and quadrature components of the local oscillator signal, two more analog multipliers 88 and 90, and a summation circuit 92. The circuit 86 has an in-phase output sin $\omega t$ on line 94 and a quadrature output cos $\omega t$ on line 96, these signals being applied as inputs to the multipliers 88 and 90, respectively. The other input to multiplier 88 is cos $\phi$ on line 76, and the other input to multiplier 90 is sin $\phi$ on line 84. The outputs of the multipliers 88 and 90, on lines 98 and 100, respectively, are input to the summation circuit 92, which has a single output on line 102. The signal on line 98 from multiplier 88 is cos $\phi$ sin $\omega t$, and the signal on line 100 from multiplier 90 is sin $\phi$ cos $\omega t$. The sum of these signals is:

$$(\cos \phi \sin \omega t) + (\sin \phi \cos \omega t),$$

which, in accordance with a well known trigonometrical identity, reduces to:

$$\sin (\omega t + \phi).$$

Thus, the circuitry of FIG. 4 operates to adjust the local clock phase to match that of the incoming signal.

With the preceeding description of FIG. 4 in mind, the following discussion of the detailed block diagram of the apparatus (FIG. 3) will be more easily understood. Where appropriate, rectangles have been drawn in broken lines around groups of components in FIG. 3 that have counterparts in FIG. 2, and the same reference numerals have been used. Also, signal lines in FIG. 2 that have in-phase and quadrature counterparts in FIG. 3 are identified with the same reference numeral but with the suffix i or q to signify that the lines are used to carry in-phase or quadrature components of the signals. For example, the incoming signal on line 30 is identified as being present on lines 30i and 30q after processing by a ninety-degree rotation circuit 110 in FIG. 3.

Phase detector 10 includes two analog multipliers 112 and 114 and two data filters 116 and 118 connected in the same manner as in the phase detection portion of FIG. 4. Therefore the outputs on lines 34i and 34q are cos ($\theta_D+\phi$) and sin ($\theta_D+\phi$), respectively, where $\theta_D$ is the phase shift due to data modulation on the received signal, and $\phi$ is the carrier offset angle. During the carrier-only portion of the preamble, $\theta_D$ is zero, and a switch 120 in a carrier-only position applies a constant signal level as an input to the data resolving circuit 12. The latter also has two multipliers 122 and 124 and two loop filters 126 and 128, also connected in the same manner as in the phase detection portion of FIG. 4. When data or a coded data pattern is being received, the switch 120 is in its other position, and estimated data signals in the form cos $\theta_D'$ are supplied to the data resolving circuit 12. The output of the data resolving circuit 12, on lines 36i and 36q, is connected to the phase rotation circuit 14, which has two multipliers 130 and 132, a summation circuit 134 and a quadrature circuit 136, all connected in the manner of the phase steering portion of FIG. 4. The output of the data resolving circuit 12 will be in the form cos $\phi'$ and sin $\phi'$, where $\phi'$ is the estimated carrier offset angle. The output of the phase rotation circuit 14, on line 40, will be cos ($\omega t+\phi'$). The mathematical analysis is the same as that provided in describing FIG. 4.

The phase detection circuit 18 also has two multipliers 140 and 142 and two data filters 144 and 146, again connected in the manner of FIG. 4. The data outputs on lines 42i and 42q are passed through limiting detector circuits 148 and 150, and then to the data sampler 20, which is shown diagrammatically as including two simple switches actuated by clocking signals.

The squaring circuit 22 is implemented as a multiplier 152, both inputs of which are derived from the in-phase data line 42i. The output of the squaring circuit 22 is connected to the third phase detection circuit 24, which also has two multipliers 154 and 156 and two loop filters 158 and 160, again connected as in the manner of FIG. 4. The outputs of the phase detection circuit 24 are connected to the phase rotation circuit 26, which has two multipliers 162 and 164, a summation circuit 166, and a quadrature circuit 168, again all connected in the manner of the phase steering circuit of FIG. 4. It will be understood that the mathematical analysis for this part of the apparatus is identical with that for FIG. 4. The resultant phase-corrected clock signal on line 52 is in the form cos ($\omega_{CL}+\phi_{CL}$), where $\omega_{CL}$ is the frequency of the data clock and $\phi_{CL}$ is the offset between the local data clock and the received data clock rate.

There is also an I/Q clock generator 170, which generates from the phase-corrected clock signals on line 52 appropriate control signals for the data sampler 20, depending on the nature of the modulation. For quadrature phase-shift keying (QPSK), the signals to the two sampling switches will be identical. For staggered QPSK (SQPSK), the clocking signals from the generator 170 will be 180 degrees out of phase.

The data resolving circuit 12 shown in FIG. 3 is limited to applications in which the data is random, that is when the data signal has a zero mean value. It will be recalled that each output of the multipliers 122 and 124 has a double-frequency component that is filtered out by the loop filters 126 and 128. Specifically, the double-frequency term has an angular frequency of ($\phi+2\theta_D$). When the data has a zero mean value, the filters will operate to remove the $2\theta_D$ term, but when the data signals are not random, another configuration of the data resolving circuit is necessary, and is shown in FIG. 5.

Basically, the alternative arrangement for data resolution includes four analog multipliers 180, 182, 184 and 186, and two summation circuits 188 and 190. Multiplier 180 is connected to receive line 34i as one input, carrying difference signal cos ($\theta_D+\phi$), and the estimated in-phase data signal cos $\theta_D'$ on line 42i as its other input. Similarly, multiplier 182 is connected to receive line 34q as one input, carrying the quadrature difference signal sin ($\theta_D+\phi$), and line 42i as its other input. Multipliers 184 and 186 also receive the signals on lines 34i and 34q, respectively, as first inputs, but are connected to receive the quadrature data signal sin $\theta_D'$ on line 42q as their second inputs.

The output of multiplier 180, on line 192, is input to summation circuit 188, as is the output of multiplier 186, on line 194. Similarly, the output of multiplier 182, on line 196, is input to the other summation circuit 190, as is the inverted output of multiplier 184, on line 198. The products output from the multipliers are as follows:

Multiplier 180: $[\cos \theta_D] \times [\cos (\theta_D + \phi)] = \frac{1}{2}[\cos \phi + \cos (2\theta_D + \phi)]$ Multiplier 182: $[\cos \theta_D] \times [\sin (\theta_D + \phi)] = \frac{1}{2}[\sin \phi + \sin (2\theta_D + \phi)]$ Multiplier 184: $[\sin \theta_D] \times [\cos (\theta_D + \phi)] = \frac{1}{2}[-\sin \phi + \sin (2\theta_D + \phi)]$ Multiplier 186: $[\sin \theta_D] \times [\sin (\theta_D + \phi)] = \frac{1}{2}[\cos \phi - \cos (2\theta_D + \phi)]$ It will be apparent that, when the outputs of multipliers 180 and 186 are added, two terms cancel, leaving cos $\phi$ as the output from summation circuit 184. Similarly, two terms cancel in the second summation circuit 190, leaving the term sin $\phi$ as output. These terms are filtered as before in the loop filters 126 and 128, to yield outputs on lines 36i and 36q.

Successful implementation of the phase steering or rotation aspects of the invention depends on the ability of the analog multipliers in the phase rotation circuits 14 and 26 to provide a wide range of amplitude scaling, preferably exceeding 20 dB, with a minimal phase shift through the multiplier as a result of its amplitude setting.

It will be appreciated from the foregoing that the present invention represents a significant improvement in the field of acquisition and demodulation systems. In particular, the invention provides extremely rapid acquisition of a carrier signal and similarly rapid bit synchronization. It will also be appreciated that, although specific embodiments of the invention have been described in detail for purposes of illustration, various modifications may be made without departing from the spirit and scope of the invention. Accordingly, the invention is not to be limited except as by the appended claims.

We claim:

1. For use in acquiring and demodulating a communication signal in a time-division-multiple-access system, apparatus for synchronizing a locally generated signal with a received signal, said apparatus comprising:
a local oscillator having substantially the same frequency as a received signal, but not necessarily the same phase;
phase detection means, for generating a phase difference signal indicative of the phase difference between the local oscillator signal and the received signal;
phase rotation means, responsive to the phase difference signal, for rotating the phase of the local oscillator signal by the amount of the phase difference, to provide a rotated local oscillator signal substantially in phase with the received signal;
demodulation means, for deriving data signals from the received signal; and
means for feeding the rotated local oscillator forward for use in said demodulation means.

2. Apparatus as set forth in claim 1, wherein:
said apparatus is for synchronizing with a carrier signal;
said local oscillator generates a carrier-frequency signal;
said demodulation means includes second phase detection means, having as inputs the received signal and the rotated local oscillator signal from the said phase rotation means, whereby said second phase detection means produces as output a data signal indicative of any modulation of the received signal.

3. Apparatus as set forth in claim 2, wherein said demodulation means further includes:
data resolving means connected to receive the phase difference signal from said first phase detection means, and to supply an output to said phase rotation means; and
means for coupling the data signal from said second phase detection means to said data resolving means, wherein said data resolving means functions to remove from the phase difference signal any component due to data modulation in the received signal, whereby said phase rotation means is effective to provide a phase-corrected carrier signal even when the received carrier signal is phase-modulated with data.

4. Apparatus as set forth in clam 1, wherein:
the received signal is a data clock rate signal derived from a modulated carrier signal;
said local oscillator generates a clock signal at substantially the same frequency as the data clock rate; and
said phase rotation means functions to produce a phase-corrected data clock signal substantially in phase with the received data rate, for use in demodulating the received signal.

5. For use in a time-division-multiple-access communication system, signal acquisition and demodulation apparatus, comprising:
a carrier acquisition subsystem including
a local carrier oscillator having substantially the same frequency as a received carrier signal,
phase detection means, for generating a phase difference signal indicative of the phase difference between said local carrier oscillator and the received signal, and
phase rotation means, responsive to the phase difference signal, for rotating the phase of the local carrier oscillator signal by the amount of the phase difference, to provide a phase-corrected carrier signal;
a demodulation subsystem, including
second phase detection means connected to receive the incoming signal as one input and the phase-corrected carrier signal as another input, to generate a demodulated data signal free of phase offset errors, and
data sampling means for sampling the demodulated data signal and obtaining therefrom output data; and
a data clock generation subsystem, for generating a clock signal for control of said data sampling means.

6. Apparatus as set forth in claim 5, wherein:
said carrier acquisition subsystem further includes data resolution means, for removing from the phase difference signal any component due to data modulation of the incoming carrier signal; and
said apparatus further includes means for connecting the demodulated data signal from said second phase detection means to said data resolution means, whereby said data resolution means employs the demodulated data signal to remove data modulation components from the phase difference signal, leaving a pure phase offset signal for application to said phase rotation means.

7. Apparatus as set forth in claim 6, and further including:
means for enabling said data resolution means when at times when the incoming carrier signal is known to be modulated with data.

8. Apparatus as set forth in claim 6, wherein:
said carrier acquisition subsystem further includes low-pass filter means connected to receive a carrier phase offset signal from said data resolution means; and
said local carrier oscillator is a voltage-controlled oscillator connected to receive a control signal from said low-pass filter means, to provide a frequency-corrected local carrier signal when the incoming carrier signal and said local carrier oscillator differ substantially in frequency.

9. Apparatus as set forth in claim 6, wherein said data clock generation subsystem includes:
means for deriving a received data rate signal from the demodulated data signal output from said second phase detection means;
a local data clock oscillator for generating a local clocking signal at the expected data rate;
third phase detection means, for generating clock offset signal from the local clocking signal and the derived data rate signal; and
second phase rotation means, for rotating the phase of the local clocking signal by the amount of the clock offset signal, and thereby providing a phase-corrected clocking signal for application to said data sampling means.

10. Apparatus as set forth in claim 9, wherein:
said means for deriving a received data rate signal includes means for squaring the demodulated data signal.

11. Apparatus as set forth in claim 9, wherein said data resolution means and each of said phase detection means includes:
means for rotating the phase of one input signal by ninety degrees and providing in-phase and quadrature components of the input signal;
a pair of multiplier circuits, for multiplying the real and quadrature components, respectively, of the input signal by the other input signal; and
a pair of low-pass filters connected to receive output signals from said respective multiplier circuits, to remove double-frequency components from said multipliers and leave in-phase and quadrature components indicative of the phase difference between the two input signals.

12. Apparatus as set forth in claim 11, wherein each of said phase rotation means includes:
means for rotating the phase of the local oscillator signal by ninety degrees, to provide in-phase and quadrature components of the local oscillator signal;
a pair of multiplier circuits, for multiplying the in-phase and quadrature components of the phase difference signal applied to said phase rotation means by the in-phase and quadrature components, respectively, of the local oscillator signal, and obtaining a pair of product signal; and
a summation circuit for adding the product signals and obtaining therefrom a phase-corrected output signal.

13. Apparatus as set forth in claim 12, wherein:
said pair of multiplier circuits in said data resolution means are employed for multiplying an in-phase component of the demodulated data signal by the in-phase and quadrature components, respectively, of the phase difference signal from said first phase detection means, and generating products (a) and (b), respectively;
said data resolution means further includes two additional multiplier circuits for, multiplying the quadrature component of the demodulated data signal by the in-phase and quadrature components, respectively, of the phase difference signal from said first phase detection means, and generating products (c) and (d), respectively; and
said data resolution means further includes a first summation circuit, for adding products (a) and (d) to produce an in-phase component of the carrier offset signal, and a second summation circuit, for subtracting product (c) from product (b) to produce a quadrature component of the carrier offset signal.

14. For use in acquiring and demodulating a communication signal in a time-division-multiple-access system, apparatus for synchronizing a locally generated signal with a received signal, said apparatus comprising:
a local oscillator for generating a carrier signal having substantially the same frequency as a received signal, but not necessarily the same phase;
phase detection means, for generating a phase difference signal indicative of the phase difference between the local oscillator signal and the received signal;
phase rotation means, responsive to the phase difference signal, for rotating the phase of the local oscillator signal by the amount of the phase difference, to provide a rotated local oscillator signal substantially in phase with the received signal;
second phase detection means, having as inputs the received signal and the rotated local oscillator signal from the said phase rotation means, whereby said second phase detection means produces as output a data signal indicative of any modulation of the received signal;
data resolving means connected to receive the phase difference signal from said first phase detection means, and to supply an output to said phase rotation means; and
means for coupling the data signal from said second phase detection means to said data resolving means, wherein said data resolving means functions to remove from the phase difference signal any component due to data modulation in the received signal, whereby said phase rotation means is effective to provide a phase-corrected carrier signal even when the received carrier signal is phase-modulated with data.

* * * * *